US012166556B2

(12) United States Patent
Onggosanusi et al.

(10) Patent No.: US 12,166,556 B2
(45) Date of Patent: Dec. 10, 2024

(54) METHOD AND APPARATUS FOR UPLINK TRANSMIT BEAM SELECTION

(71) Applicant: Samsung Electronics Co., Ltd., Suwon-si (KR)

(72) Inventors: Eko Onggosanusi, Coppell, TX (US); Md. Saifur Rahman, Plano, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/303,540

(22) Filed: Jun. 1, 2021

(65) Prior Publication Data
US 2021/0399783 A1 Dec. 23, 2021

Related U.S. Application Data

(60) Provisional application No. 63/185,178, filed on May 6, 2021, provisional application No. 63/042,154, filed on Jun. 22, 2020.

(51) Int. Cl.
*H04B 7/06* (2006.01)
*H04B 17/318* (2015.01)
*H04B 17/336* (2015.01)
*H04L 5/00* (2006.01)
*H04W 24/10* (2009.01)
*H04W 56/00* (2009.01)

(52) U.S. Cl.
CPC ......... *H04B 7/0695* (2013.01); *H04B 7/0626* (2013.01); *H04B 17/318* (2015.01); *H04B 17/336* (2015.01); *H04L 5/0051* (2013.01); *H04W 24/10* (2013.01); *H04W 56/001* (2013.01)

(58) Field of Classification Search
None
See application file for complete search history.

(56) References Cited

U.S. PATENT DOCUMENTS

| 2018/0167897 | A1 | 6/2018 | Sampath et al. | |
| 2019/0261289 | A1 | 8/2019 | Raghavan et al. | |
| 2021/0297959 | A1* | 9/2021 | Zhou | H04B 7/0602 |
| 2021/0351831 | A1* | 11/2021 | Venugopal | H04W 24/10 |

(Continued)

FOREIGN PATENT DOCUMENTS

WO    WO-2021036875 A1 *   3/2021   ........... H04B 7/0695

OTHER PUBLICATIONS

Intel Corporation, "Discussion on multi-beam enhancements", 3GPP TSG RAN WG1 #98, Aug. 26-30, 2019, R1-1908654, 16 pages.

(Continued)

*Primary Examiner* — Scott M Sciacca

(57) ABSTRACT

Methods and apparatuses for uplink transmit beam selection. A method for operating a user equipment (UE) includes receiving configuration information including information on a plurality of measurement reference signal (RS) resources and information on a beam reporting, measuring the measurement RS resources, and calculating the beam reporting based on the measurement. The method further includes determining whether a maximum permissible exposure (MPE) limit is met and transmitting the beam reporting. Content of the beam reporting depends on whether the MPE limit is met or not.

20 Claims, 11 Drawing Sheets

(56) References Cited

U.S. PATENT DOCUMENTS

2021/0391913 A1* 12/2021 Zhou ............... H04B 7/063
2023/0065305 A1*  3/2023 He ............... H04W 52/146

OTHER PUBLICATIONS

Sony, "Enhancements on multi-beam operation", 3GPP TSG RAN WG1#98 meeting, Aug. 26-30, 2019, R1-1908784, 9 pages.

ZTE, "Enhancements on multi-beam operation", 3GPP TSG RAN WG1 Meeting #98, Aug. 26-30, 2019, R1-1908192, 26 pages.

Notification of Transmittal of the International Search Report and the Written Opinion of the International Searching Authority, or the Declaration dated Oct. 1, 2021 in connection with International Patent Application No. PCT/KR2021/007761, 9 pages.

"LTE; Evolved Universal Terrestrial Radio Access (E-UTRA); Physical channels and modulation (3GPP TS 36.211 version 12.4.0 Release 12)", Feb. 2015, 126 pages.

"LTE; Evolved Universal Terrestrial Radio Access (E-UTRA); Multiplexing and channel coding (3GPP TS 36.212 version 12.3.0 Release 12)", Feb. 2015, 91 pages.

"LTE; Evolved Universal Terrestrial Radio Access (E-UTRA); Physical layer procedures (3GPP TS 36.213 version 12.4.0 Release 12)", Feb. 2015, 227 pages.

"LTE; Evolved Universal Terrestrial Radio Access (E-UTRA); Medium Access Control (MAC) protocol specification (3GPP TS 36.321 version 12.4.0 Release 12)", Feb. 2015, 62 pages.

"LTE; Evolved Universal Terrestrial Radio Access (E-UTRA); Radio Resource Control (RRC); Protocol specification (3GPP TS 36.331 version 12.4.1 Release 12)", Feb. 2015, 415 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"3rd Generation Partnership Project; Technical Specification Group Radio Access Network; NR; Medium Access Control (MAC) protocol specification (Release 16)", 3GPP TS 38.321 v16.0.0, Mar. 2020, 141 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

"3rd Generation Partnership Project; Technical Specification Group Radio Access Network; NR; Physical layer measurements (Release 16)", 3GPP TS 38.215 V16.0.0, Dec. 2019, 21 pages.

Extended European Search Report issued Oct. 9, 2023 regarding Application No. 21827957.8, 9 pages.

* cited by examiner

METHOD AND APPARATUS FOR UPLINK TRANSMIT BEAM SELECTION

CROSS-REFERENCE TO RELATED APPLICATIONS AND CLAIM OF PRIORITY

This application claims priority to U.S. Provisional Patent Application No. 63/042,154 filed Jun. 22, 2020 and U.S. Provisional Patent Application No. 63/185,178, filed May 6, 2021. The above-identified provisional patent applications are hereby incorporated by reference in their entirety.

TECHNICAL FIELD

The present disclosure relates generally to wireless communication systems and, more specifically, beam selection.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for uplink transmit beam selection.

In one embodiment, a user equipment (UE) is provided. The UE includes a transceiver configured to receive configuration information including information on measurement reference signal (RS) resources and information on a beam reporting. The UE further includes a processor operably connected to the transceiver, the processor configured to measure the measurement RS resources, calculate the beam reporting based on the measurement, and determine whether a maximum permissible exposure (MPE) limit is met. The transceiver is further configured to transmit the beam reporting. Content of the beam reporting depends on whether the MPE limit is met or not.

In another embodiment, a base station (BS) is provided. The BS includes a processor configured to generate configuration information including information on a plurality of measurement RS resources and information on a beam reporting. The BS further includes a transceiver operably connected to the processor. The transceiver is configured to transmit the configuration information and receive the beam reporting. Content of the beam reporting depends on whether a MPE limit is met or not.

In yet another embodiment, a method for operating a UE is provided. The method includes receiving configuration information including information on a plurality of measurement RS resources and information on a beam reporting, measuring the measurement RS resources, and calculating the beam reporting based on the measurement. The method further includes determining whether a MPE limit is met and transmitting the beam reporting. Content of the beam reporting depends on whether the MPE limit is met or not.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
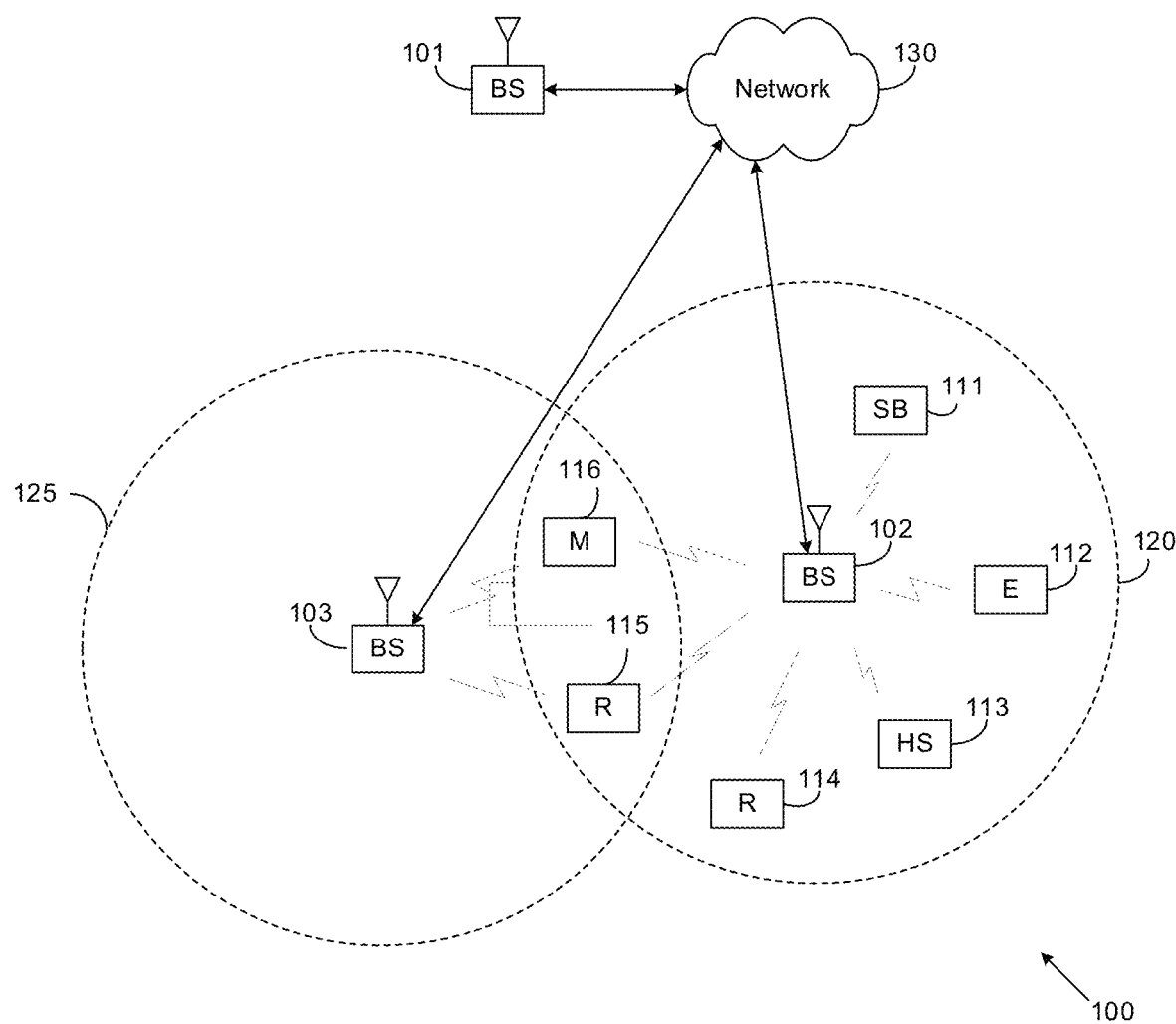
FIG. 1 illustrates an example wireless network according to various embodiments of the present disclosure.

FIGS. 1 through 11, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 16.0.0, "NR, Physical channels and modulation" ("REF 6"); 3GPP TS 38.212 version 16.0.0, "NR, Multiplexing and Channel coding" ("REF 7"); 3GPP TS 38.213 version 16.0.0, "NR, Physical Layer Procedures for Control" ("REF 8"); 3GPP TS 38.214 version 16.0.0, "NR, Physical Layer Procedures for Data" ("REF 9"); 3GPP TS 38.321 version 16.0.0, "NR, Medium Access Control (MAC) Protocol Specification" ("REF 10"); 3GPP TS 38.331 version 16.0.0, "NR, Radio Resource Control (RRC) Protocol Specification" ("REF 11"); and 3GPP TS 38.215 version 16.0.0, "NR, Physical Layer Measurements" ("REF 12")".

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmits beam selection information to UEs 111-116 and configure UEs 111-116 for beam selection as described in embodiments of the present disclosure. In various embodiments, one or more of UEs 111-116 receive beam selection information as described in embodiments of the present disclosure.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
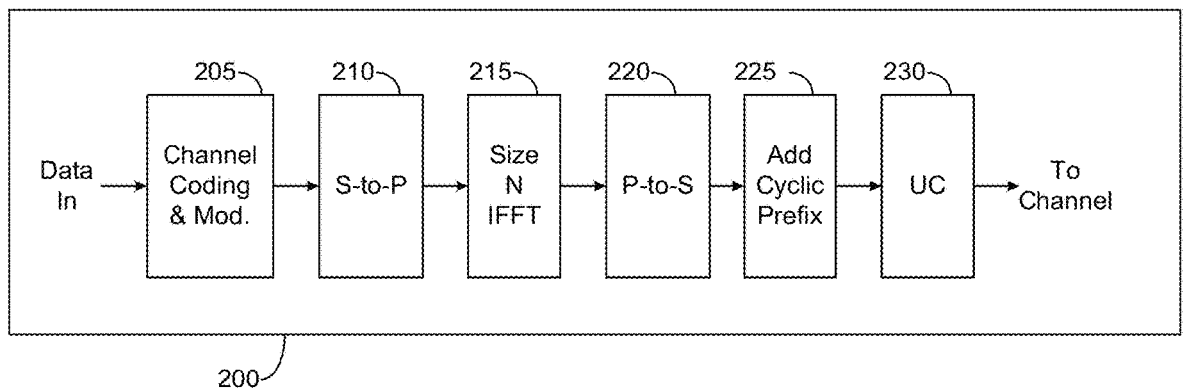
FIGS. 2A and 2B illustrate example wireless transmit and receive paths according to various embodiments of the present disclosure.
Figure 2B:
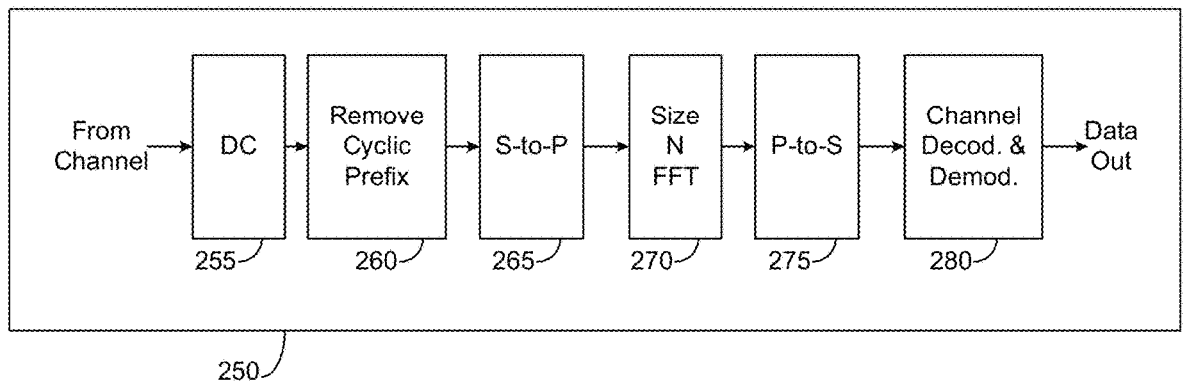

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive beam selection information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for beam reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
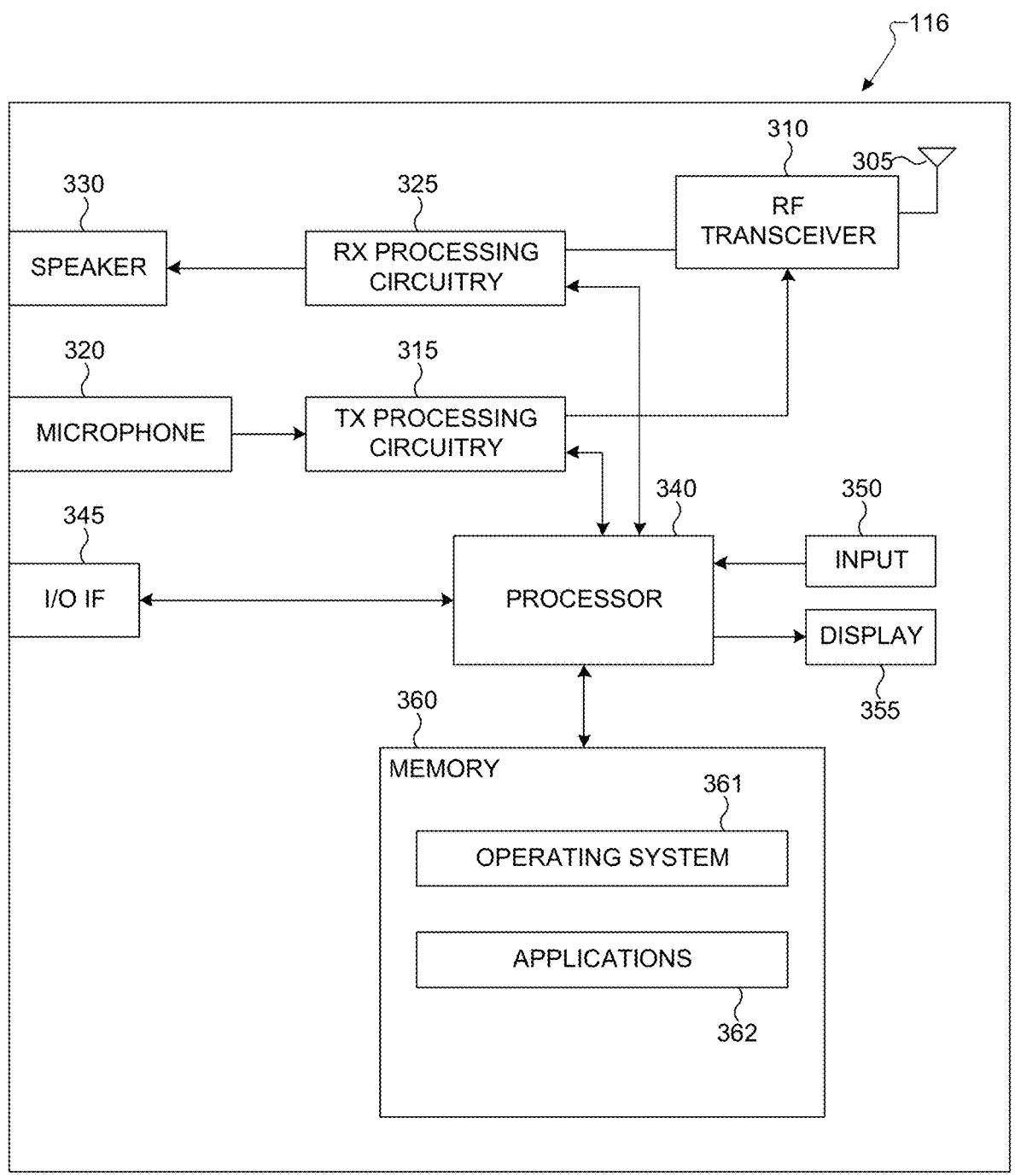
FIG. 3A illustrates an example UE according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for beam selection for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for beam selection. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
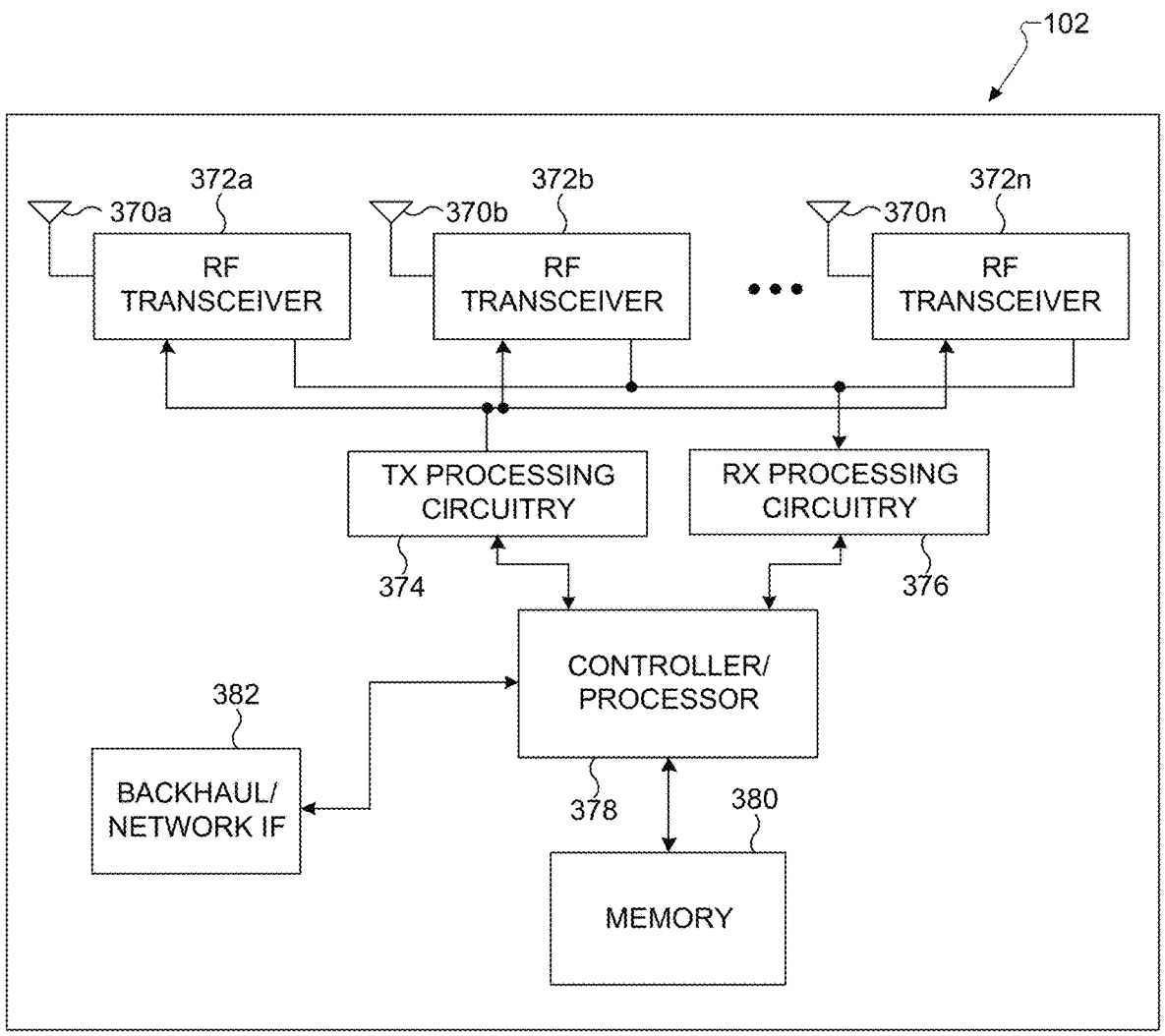
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support configuring a UE for uplink beam selection as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmit configuration information for beam selection to a UE and receive beam selection information generated based thereon, respectively.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE and Rel.15 NR. For next generation cellular systems such as 5G, it is expected that the maximum number of CSI-RS ports remain more or less the same.

Figure 4:
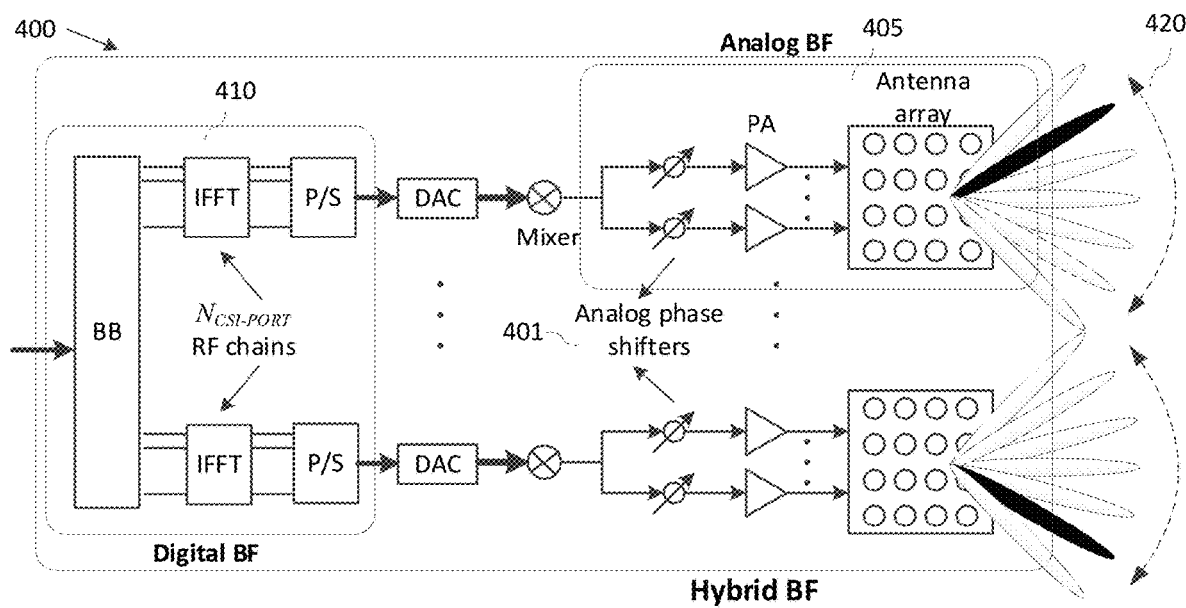
FIG. 4 illustrates an example beamforming architecture for a transmitter wherein one channel state information reference signal (CSI-RS) port is mapped onto a large number of analog-controlled antenna elements according to various embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of FIG. 4. For example, transmitter 400 may be present in the gNB 102 or the UE 116 of FIG. 1. The embodiment of the transmitter 400 shown in FIG. 4 is for illustration only, and other transmitters can have the same or similar configuration.

FIG. 4 illustrates an example beamforming architecture for a transmitter 400 wherein one channel state information reference signal (CSI-RS) port is mapped onto a large number of analog-controlled antenna elements according to various embodiments of the present disclosure. The embodiment of the transmitter 400 is for illustration only. As illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz. In this case, the system can employ only analog beams. Due to the $O_2$ absorption loss around 60 GHz frequency (~10 dB additional loss @100 m distance), larger number of and sharper analog beams (hence larger number of radiators in the array) will be needed to compensate for the additional path loss.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be non-zero power (NZP) CSI-RS and/or SSB (synchronization signal block, which includes primary synchronization signal, secondary synchronization signal, and PBCH). Here, DL beam indication is done via the TCI field in DL-related downlink control information (DCI) which includes an index to one (e.g., only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (e.g., only one) reference RS. This linkage is configured via higher-layer signaling using the SpatialRelationInfo RRC parameter. Essentially, only one TX beam may be indicated to the UE.

In one example pertinent to Rel.15/16 NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, Rel.15/16 beam management becomes cumbersome and is unlikely able to keep up with more aggressive use cases which require large number of beams and fast beam switching (e.g. higher frequency bands, high mobility, and/or larger number of narrower analog beams). In addition, Rel.15/16 was designed to accommodate a number of unknown or rudimentary capabilities (e.g. UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In one example pertinent to Rel.15/16 NR, when beam correspondence is utilized, UL beam selection can be performed via measuring DL RS (CSI-RS and/or SSB) and CRI reporting accompanied with corresponding beam metrics (e.g. RSRP, SINR). That is, based on the CRI/RSRP or CRI/SINR reporting from the UE, the network (NW) can assume that the UE performs UL transmission on PUSCH with the UL TX beam associated with one of the latest CRI reports (especially the one with the highest RSRP or/SINR). Likewise, the UE can assume that the NW knows about this UE selection. Therefore, there is no need for a separate UL beam indication (e.g. via SRI field or UL-TCI field in the respective UL grant).

In Rel.15/16 NR, when beam correspondence is not utilized, UL beam selection can be performed via the NW selecting the UL TX beam and indicating the UL TX beam to the UE via the UL grant (signaled via SRI field or UL-TCI field—essentially indicating the UL TCI state associated with the UL TX beam). This selection is enabled by measuring the SRS transmitted from the UE (configured by the NW).

In either case, when an event that results in the UE having to select an UL TX beam different from what the NW expects, some additional mechanisms are needed to ensure that the NW is aware of the UE decision. Such an event can happen, for instance, when the UE transmission is restricted by the so-called Maximum Permissible Exposure (MPE) regulation especially in North America. That is, to prevent any excessive electromagnetic wave exposure on delicate soft tissues (e.g. brain tissues), the UE is to avoid transmitting high energy signal along some directions (e.g. toward the head). Unfortunately, such directions may correspond to the "best" UL TX beams (e.g. associated with the CRI of the highest reported RSRP/SINR or associated with the SRS resource yielding the best measured SINR at the NW). When the "best" UL TX beams are not used for UL transmission, some loss of UL throughput (especially coverage) will occur.

Therefore, there is a need for efficient designs for enabling UL TX beam selection not only to avoid outage due to events such as that pertaining to the MPE regulation, but also reducing the associated loss of UL throughput.

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

This disclosure covers several components which can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the information to assign a particular UL TX beam to the UE. This option is applicable when DL-UL beam pair correspondence holds or is assumed.

The reference RS can be dynamically triggered by the NW/gNB (e.g. via DCI in case of AP RS), preconfigured with a certain time-domain behavior (such as periodicity and offset, in case of periodic RS), or a combination of such pre-configuration and activation/deactivation (in case of semi-persistent or SP RS).

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RS s (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 5:
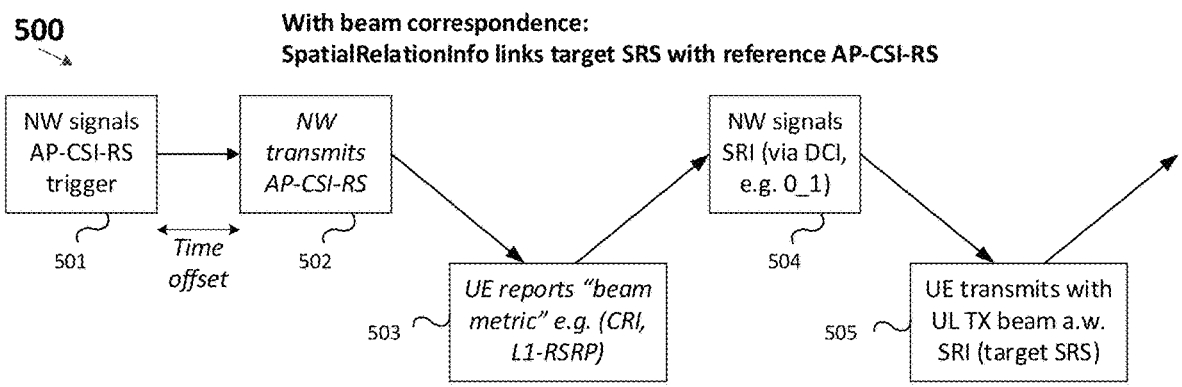
FIG. 5 illustrates a flow diagram of example UL beam management with aperiodic (AP) CSI-RS triggering and beam reporting according to one or more embodiments of the present disclosure.

FIG. 5 illustrates a flow diagram 500 of example UL beam management with AP CSI-RS triggering and beam reporting according to one or more embodiments of the present disclosure. The embodiment in FIG. 5 is for illustration only. In the example illustrated in diagram 500 of FIG. 5, an UL multi-beam operation starts with the gNB/NW signaling to a UE an aperiodic CSI-RS (AP-CSI-RS) trigger or indication (step 501). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 502), the UE measures the AP-CSI-RS and, in turn, calculates and reports a "beam metric" (indicating quality of a particular TX beam hypothesis) (step 503). Examples of such beam reporting are CSI-RS resource indicator (CRI) or SSB resource indicator (SSB-RI) coupled with the resource indicator's associated L1-RSRP/L1-RSRQ/L1-SINR/CQI. Upon receiving the beam report from the UE, the NW can use the beam report to select an UL TX beam for the UE and indicate the UL TX beam selection (step 504) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 505).

Figure 6:
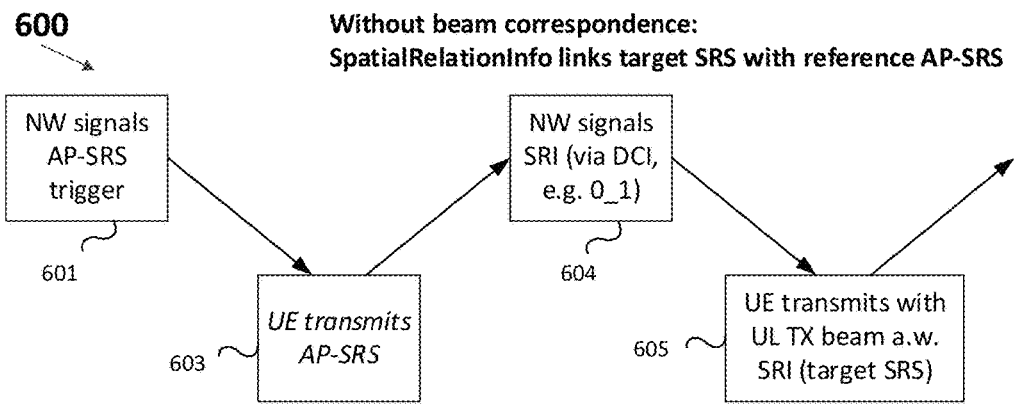
FIG. 6 illustrates a flow diagram of example UL beam management with AP SRS triggering according to one or more embodiments of the present disclosure.

FIG. 6 illustrates a flow diagram 600 of example UL beam management with AP SRS triggering according to one or more embodiments of the present disclosure. The embodiment in FIGURE is for illustration only. In another example, as illustrated in diagram 600 of FIG. 6, an UL multi-beam operation starts with the gNB/NW signaling to a UE an aperiodic SRS (AP-SRS) trigger or request (step 601). This trigger can be included in a DCI (either UL-related or DL-related). Upon receiving and decoding the AP-SRS trigger (step 602), the UE transmits AP-SRS to the gNB/NW (step 603) so that the NW (or gNB) can measure the UL propagation channel and select an UL TX beam for the UE. The gNB/NW can then indicate the UL TX beam selection (step 604) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 605).

In the above two example embodiments, only one UL TX beam is indicated to the UE. Extension for multi panel UEs can be found, by way of example, in U.S. Pat. No. 10,887,884, which is incorporated by reference herein.

The SRI used in embodiments 500 and 600 can also be replaced with UL-TCI wherein an UL-TCI field can be introduced in the pertinent UL-related DCI(s), either in place of or in addition to the SRI field in Rel.15/16.

The aperiodic CSI-RS (along with the associated aperiodic reporting) in illustrated in FIG. 5 and the aperiodic SRS illustrated in FIG. 6 can be substituted with that of another time-domain behavior such as semi-persistent (SP) or periodic (P).

The present disclosure includes the following components. A first component includes example embodiments of methods to enable more efficient UE procedures for UL beam selection. A second component includes example embodiments of methods for configuring and/or utilizing the embodiments in the first component.

For the first component (that is, UE procedures for UL beam selection), the following example embodiments include at least one method for UL beam selection in response to an event that can result or even necessitate in the UE changing the UL TX beam selection. As described above, such an event can happen, for instance, when the UE transmission is restricted by the so-called Maximum Permissible Exposure (MPE) regulation.

In any of the embodiments or sub-embodiments below, a flowchart is used for illustrative purposes. The present disclosure covers any possible variation of the flowchart as long as at least some of the components are included. Such components include the assessment of UL condition and the event-dependent UE reporting behavior.

In one embodiment (I), the UE (termed UE-k) is configured to report at least one CRI or SSB-RI and, optionally, along with the associated beam metric (e.g. L1-RSRP, L1-SINR, or any other beam metric). The time-domain behavior of this reporting can be configured as aperiodic (AP), semi-persistent (SP), or periodic (P). The UE-k is also configured with at least one DL measurement RS such as CSI-RS or SSB.

Figure 7:
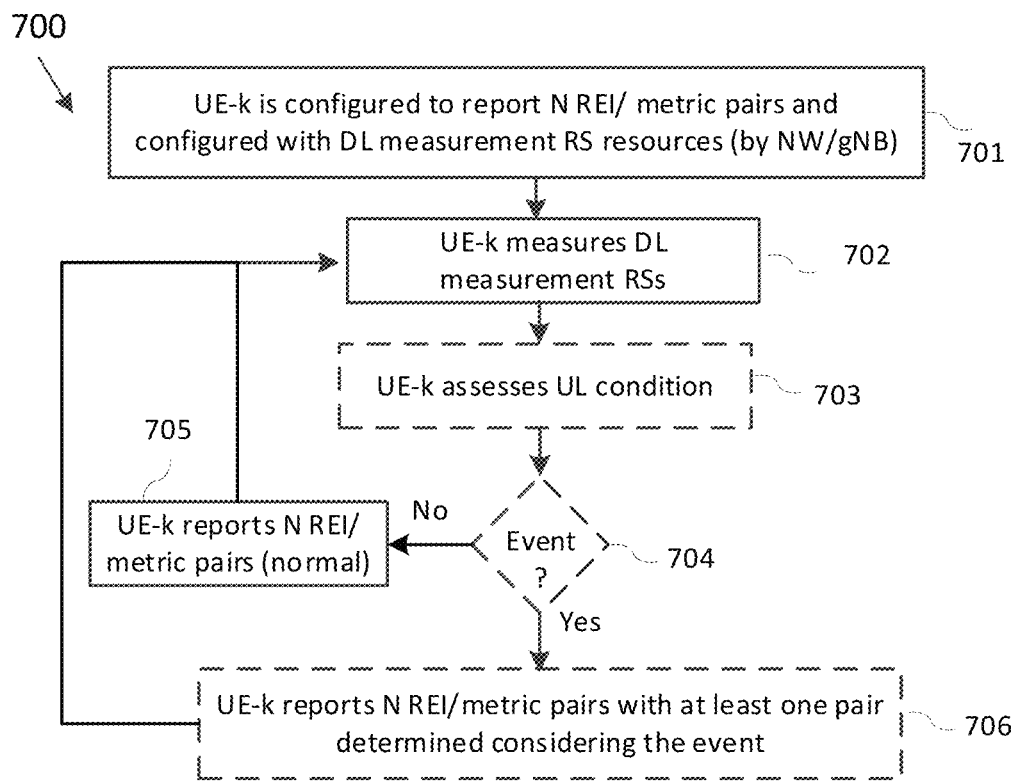
FIG. 7 illustrates a flow diagram of example UE-initiated beam reporting according to one or more embodiments of the present disclosure.

FIG. 7 illustrates a flowchart of a method 700 of example UE-initiated beam reporting according to one or more embodiments of the present disclosure. The embodiment of the method 700 is for illustration only, and the method 700 may be implemented by a UE such as UEs 111-116 of FIG. 1. In one sub-embodiment (I.1), as illustrated in method 700 of FIG. 7, UE-k is configured (by the NW/gNB) to report N REI/beam metric pairs (N≥1, step 701). As mentioned above, in NR, any of the REI can be a CRI or an SSB-RI. The beam metric can represent link quality associated with data (PDSCH) and/or dedicated control (PDCCH). Examples of beam metric include L1-RSRP, L1-SINR, CQI, or hypothetical BLER, possibly accompanied with at least one measurement RS resource index/indicator. The REI indicates the DL measurement RS resource index with the corresponding beam metric. UE-k is configured (by the NW/gNB) with at least N DL measurement RS resources (such as CSI-RS or SSB). This configuration can be performed via higher-layer (RRC) signaling. Optionally, the NW/gNB can signal/update the (sub)set of DL measurement RS resources dynamically via L1 or L2 DL control (PDCCH or MAC CE). These resources are used by UE-k to perform measurement and calculate the beam metric.

Subsequently UE-k can measure the DL measurement RS (step 702) and, optionally, assess the UL condition (step 703) to determine whether the event of interest occurs (step 704). For instance, if this event pertains to MPE regulation, UE-k can compare the REI/metric pairs with a power spectrum density (PSD) vs. direction profile that reflects conformance to the MPE regulation. The UE-k can maintain knowledge on directions associated with the configured DL measurement RS resources acquired, for instance, during the latest DL beam training procedure.

If the event is declared negative, UE-k proceeds to report the latest calculated N REI/metric pair(s) (when the time comes, depending on the time-domain behavior) just as UE-k normally does (step 705). If the event is declared positive (for instance, MPE regulation is unmet with at least one of the calculated N REI/metric pairs), UE-k proceeds to report N REI/metric pair(s) (when the time comes, depending on the time-domain behavior) with at least one REI/metric pair determined based on the event (step 706). For example, if the event pertains to MPE regulation, M≤REI/metric pair(s) are selected/determined such that the DL measurement RS resources associated with the M REI(s) conform with the MPE regulation. The value of M can be fixed, predetermined, or configured via higher-layer (e.g. RRC) signaling. Optionally, the value of M can be signaled/updated dynamically via MAC CE (L2) or PDCCH (L1). Which M out of N pairs can be determined by a fixed or predetermined rule (for instance, if M=1, it can be specified that M is the 1st out of N pairs) or configured via higher-layer (e.g. RRC) signaling or signaled/updated dynamically via MAC CE (L2) or PDCCH (L1).

Note that in this sub-embodiment, the NW/gNB does not necessarily know that the event occurred. In one example, when N>1, the NW/gNB can know that the event occurred by comparing the beam metric values. For example, when the N REI/metric pairs are sorted in decreasing value of beam metrics and the first M out of N REI/metric pairs can be reported based on the event, then the beam metric values for at least one of the first M REI/metric pair(s) can be less than at least one of the remaining (N-M) REI/metric pair(s), and hence, the NW/gNB can know that the event has occurred.

Figure 8:
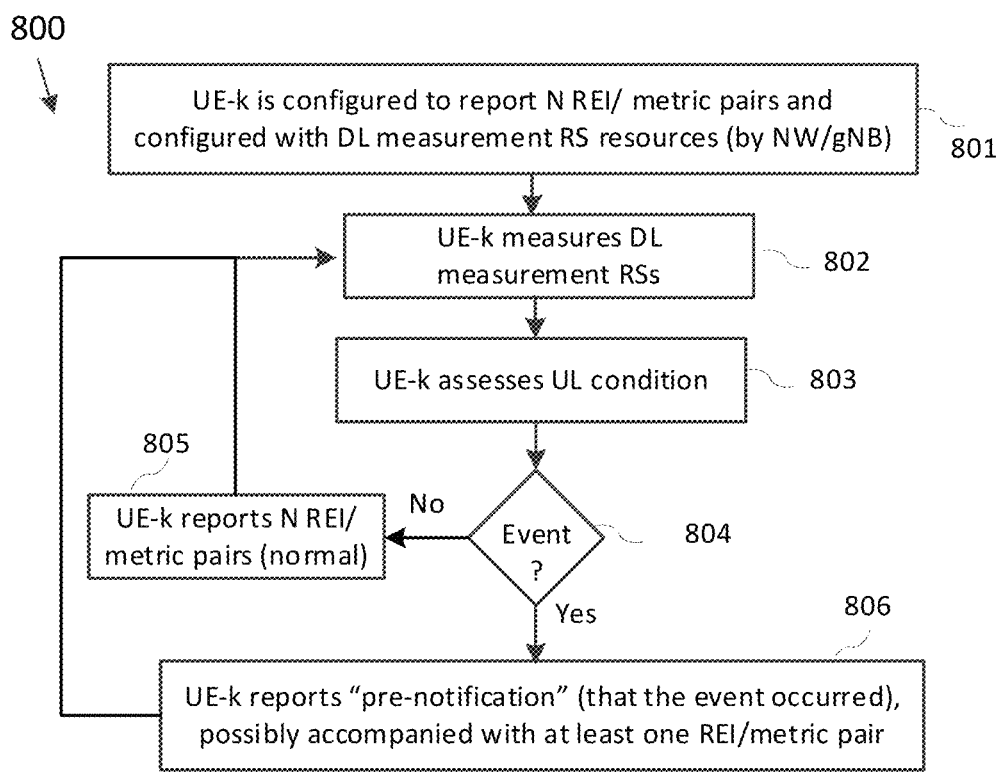
FIG. 8 illustrates a flow diagram of example UE-initiated beam reporting according to one or more embodiments of the present disclosure.

FIG. 8 illustrates a flow diagram of example UE-initiated beam reporting according to one or more embodiments of the present disclosure. The embodiment of the method 800 is for illustration only, and the method 800 may be implemented by a UE such as UEs 111-116 of FIG. 1. In one sub-embodiment (I.2), as illustrated in method 800 of FIG. 8, UE-k is configured (by the NW/gNB) to report N REI/beam metric pairs (N≥1, step 801). As mentioned above, in NR, any of the REI can be a CRI or an SSB-RI. The beam metric can represent link quality associated with data (PDSCH) and/or dedicated control (PDCCH). Examples of beam metric include L1-RSRP, L1-SINR, CQI, or hypothetical BLER, possibly accompanied with at least one measurement RS resource index/indicator. The REI indicates the DL measurement RS resource index with the corresponding beam metric. UE-k is configured (by the NW/gNB) with at least N DL measurement RS resources (such as CSI-RS or SSB). This configuration can be performed via higher-layer (RRC) signaling. Optionally, the NW/gNB can signal/update the (sub)set of DL measurement RS resources dynamically via L1 or L2 DL control (PDCCH or MAC CE). These resources are used by UE-k to perform measurement and calculate the beam metric.

Subsequently UE-k can measure the DL measurement RS (step 802) and assess the UL condition (step 803) to determine whether the event of interest occurs (step 804). For instance, if this event pertains to MPE regulation, UE-k can compare the REI/metric pairs with a power spectrum density (PSD) vs. direction profile that reflects conformance to the MPE regulation. The UE-k can maintain knowledge on directions associated with the configured DL measurement RS resources acquired, for instance, during the latest DL beam training procedure.

If the event is declared negative, UE-k proceeds to report the latest calculated N REI/metric pair(s) (when the time comes, depending on the time-domain behavior) just as UE-k normally does (step 805).

If the event is declared positive (for instance, MPE regulation is unmet with at least one of the calculated N REI/metric pairs), UE-k proceeds to report a pre-notification message to indicate to the NW/gNB that the event occurred. (step 806) An example of this pre-notification message can be a message that the MPE event" occurred. This message can be transmitted either on one of the reserved UL resources (on PUCCH, PUSCH, PRACH, or a combination of any), or on a same resource used for the configured beam reporting. The message can be signaled as a CSI parameter that is always present and a part of the beam reporting (whose presence is configured via RRC signaling) where the message can reported/signaled by the UE either jointly with another existing CSI or beam report parameter or separately as a new parameter. Optionally, the message can be present and reported only when the event occurs.

Optionally, the pre-notification message can be accompanied with a reporting of P≥1 REI/metric pairs. The value of P can be fixed or predetermined (for instance, P can be set to 1, or can be set to N), or configured via higher-layer (e.g. RRC) signaling. Optionally, the value of P can be signaled/signaled dynamically via MAC CE (L2) or PDCCH (L1). Optionally, the value of P can be reported by the UE either jointly with the pre-notification message (or an existing CSI or beam report parameter) or separately as a new parameter. The P REI/metric pairs are selected/determined such that the DL measurement RS resources associated with the P REI(s) conform with the MPE regulation. The P REI/metric pairs can either be transmitted in the same UL slot as the pre-notification message (hence multiplexed together as a part of UCI), or X slot(s) after the pre-notification message (where X>0). In one example, the value X can be fixed or configured from a fixed set of X values where this configuration can be via RRC or/and MAC CE or/and DCI. In one example, the value X can depend on the channel used to report the pre-notification message or/and P REI/metric pairs. If the P REI/metric pairs are reported in the same slot as the pre-notification message, either one- or two-part UCI can be used. For instance, if two-part UCI is used, part 1 includes the pre-notification message. If the pre-notification message indicates that the event occurs, P REI/metric pairs are reported in part 2. Else, the N REI/metric pair(s) are included in part 2 just as normally (step 805).

In one example, the parameter P is used to indicate the pre-notification message and the number of REI/metric(s) corresponding to the event being positive jointly. For example, a value P=0 corresponds to (indicates) the absence of the pre-notification message (i.e. pre-notification message not signaled), and a value P>1 corresponds to (indicates) the presence of the pre-notification message (i.e. pre-notification message being signaled) and also the number of REI/metric pairs in response to the event being declared positive.

Optionally, the pre-notification message can be accompanied with a reporting of P>1 REI(s) (without beam metrics). Likewise, the value of P can be fixed or predetermined (for instance, P can be set to 1, or can be set to N), or configured via higher-layer (e.g. RRC) signaling. Optionally, the value of P can be signaled dynamically via MAC CE (L2) or PDCCH (L1). Optionally, the value of P can be reported by the UE either jointly with the pre-notification message (or an existing CSI or beam report parameter) or separately as a new parameter. The P REI(s) are selected/determined such that the DL measurement RS resources associated with the P REI(s) conform with the MPE regulation. The P REI(s) can either be transmitted in the same UL slot as the pre-notification message (hence multiplexed together as a part of UCI), or X slot(s) after the pre-notification message (where X>0). In one example, the value X can be fixed or configured from a fixed set of X values where this configuration can be via RRC or/and MAC CE or/and DCI. In one example, the value X can depend on the channel used to report the pre-notification message or/and P REI(s). If the P REI(s) are reported in the same slot as the pre-notification message, either one- or two-part UCI can be used. For instance, if two-part UCI is used, part 1 includes the pre-notification message. If the pre-notification message indicates that the event occurs, P REI(s) are reported in part 2. Else, the N REI/metric pair(s) are included in part 2 just as normally (step 805).

In one example, the parameter P is used to indicate the pre-notification message and the number of REI (s) corresponding to the event being positive jointly. For example, a value P=0 corresponds to (indicates) the absence of the pre-notification message (i.e. pre-notification message not signaled), and a value P>1 corresponds to (indicates) the presence of the pre-notification message (i.e. pre-notification message being signaled) and also the number of REI(s) in response to the event being declared positive.

Note that in this sub-embodiment, the NW/gNB knows that the event occurred.

For all the above sub-embodiments of embodiment I, if UL-TCI state definition is used to link (via a QCL relationship) an UL TCI state with an REI of interest (that is, the CRI or SSB-RI as described/utilized above), the REIs in the above description can also be UL-TCIs indicating the UL TCI states associated with the DL measurement RS resources.

In another embodiment (II), the UE (termed UE-k) is configured with L>1 SRS resources. These K SRS resources can be used by the NW/gNB to measure the UL channel condition along L different spatial directions (represented by the precoding operation performed at the UE-k transparent to the NW/gNB).

Figure 9:
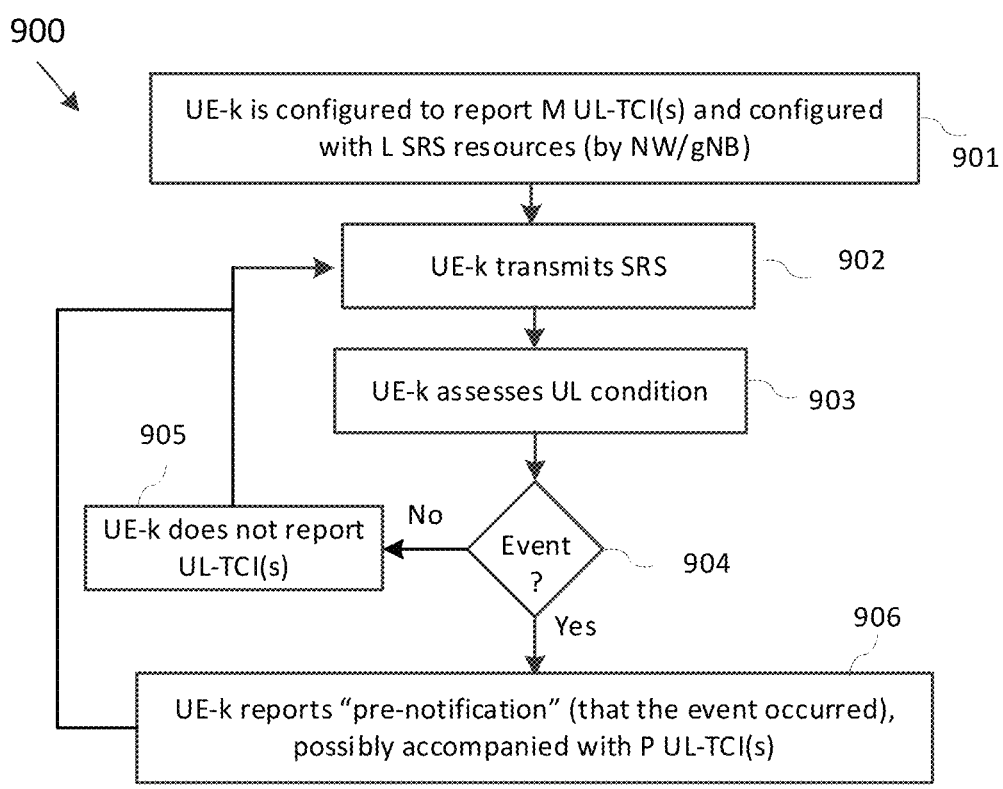
FIG. 9 illustrates a flow diagram of example UE-initiated beam selection according to one or more embodiments of the present disclosure.

FIG. 9 illustrates a flow diagram of example UE-initiated beam selection according to one or more embodiments of the present disclosure. The embodiment of the method 900 is for illustration only, and the method 900 may be implemented by a UE such as UEs 111-116 of FIG. 1. In a sub-embodiment (II.1), as illustrated in method 900 of FIG. 9, UE-k is configured (by the NW/gNB) to report M UL-TCI(s) (M≥1, step 901). Here, UL-TCI represents an UL TCI state as configured in the UL TCI state definition (via higher-layer signaling) wherein a TCI state is linked/associated to a measurement RS that can be used to represent an UL "direction" (i.e. UL TX beam). In this sub-embodiment, the UL TCI state is linked to an SRS resource index (SRI) which represents a configured SRS resource since SRS is used to measure the link quality of the UL channel(s). UE-k is also configured (by the NW/gNB) with L>1 SRS resources. This configuration can be performed via higher-layer (RRC) signaling. Optionally, the NW/gNB can signal/update the (sub)set of SRS resources dynamically via L1 or L2 DL control (PDCCH or MAC CE). These resources are used by UE-k to enable the NW/gNB to perform UL channel measurement.

Subsequently UE-k can transmit the SRS (step 902) and assess the UL condition (step 903) to determine whether the event of interest occurs (step 904). For instance, if this event pertains to MPE regulation, UE-k can compare the precoders applied to the L SRS resources with a power spectrum density (PSD) vs. direction profile that reflects conformance to the MPE regulation. UE-k maintains knowledge on directions associated with the configured SRS resources used in the latest SRS transmission.

If the event is declared negative, UE-k proceeds with the SRS-based UL operation just as UE-k normally does, which entails not reporting any UL-TCI (step 905). This can include, for instance, receiving an UL grant from the NW/gNB wherein the associated UL-related DCI includes at least one UL-TCI or SRI DCI field.

If the event is declared positive (for instance, MPE regulation is unmet with at least one of the configured L SRS resources), UE-k proceeds to report a pre-notification message to indicate to the NW/gNB that the event occurred. (step 906) An example of this pre-notification message can be a message that the MPE event" occurred. This message can be transmitted either on one of the reserved UL resources (on PUCCH, PUSCH, PRACH, or a combination of any), or on a same resource used for the configured CSI and/or beam reporting. The message can be signaled as a CSI parameter that is always present and a part of the beam reporting (whose presence is configured via RRC signaling) where the message can reported/signaled by the UE either jointly with another existing CSI or beam report parameter or separately as a new parameter. Optionally, the message can be present and reported only when the event occurs.

Optionally, the pre-notification message can be accompanied with a reporting of P>1 UL-TCI(s). The value of P can be fixed or predetermined (for instance, P can be set to 1), or configured via higher-layer (e.g. RRC) signaling. Optionally, the value of P can be signaled dynamically via MAC CE (L2) or PDCCH (L1). Optionally, the value of P can be reported by the UE either jointly with the pre-notification message (or an existing CSI or beam report parameter) or separately as a new parameter. The P UL-TCI(s) are selected/determined such that the SRS resources associated with the P UL-TCI(s) conform with the MPE regulation. The P UL-TCI(s) can either be transmitted in the same UL slot as the pre-notification message (hence multiplexed together as a part of UCI), or X slot(s) after the pre-notification message (where X>0). In one example, the value X can be fixed or configured from a fixed set of X values where this configuration can be via RRC or/and MAC CE or/and DCI. In one example, the value X can depend on the channel used to report the pre-notification message or/and P UL-TCI(s). If the P UL-TCI(s) are reported in the same slot as the pre-notification message, either one- or two-part UCI can be used. For instance, if two-part UCI is used, part 1 includes the pre-notification message. If the pre-notification message indicates that the event occurs, P UL-TCI(s) are reported in part 2 (in addition to the regular content of part 2 UCI). Else, nothing is added to part 2 UCI (step 905).

In one example, the parameter P is used to indicate the pre-notification message and the number of UL-TCI(s) corresponding to the event being positive jointly. For example, a value P=0 corresponds to (indicates) the absence of the pre-notification message (i.e. pre-notification message not signaled), and a value P>1 corresponds to (indicates) the presence of the pre-notification message (i.e. pre-notification message being signaled) and also the number of UL-TCI(s) in response to the event being declared positive.

Note that in this sub-embodiment, the NW/gNB knows that the event occurred.

For all the above sub-embodiments of embodiment II, UL-TCI can also be substituted with SRI, e.g. if UL TCI is not defined/specified and/or Rel.15/16 SpatialRelationInfo is used instead.

For all the above sub-embodiments of embodiment II, the UL-TCI or SRI reporting can also be accompanied with some indication among the reported/recommended UL-TCI states how far they are from not meeting the MPE regulation or how far they are from the MPE-violating region.

It should be noted that for this particular embodiment, the occurrence of the event (such as the "MPE event") can be reduced by either more frequent or UE-initiated SRS triggering wherein UE-k can reconfigure the precoding applied to the L SRS resources (whenever needed) in such a way that the event occurrence can be minimized, if not avoided.

For the second component (that is, configuration for UL beam selection), this component can be used together with the embodiments and sub-embodiments of the first component. It is particularly relevant when more than one embodiments/sub-embodiments of the first component are utilized.

In one embodiment (III.1), a scheme can be configured via higher layer (e.g. RRC) signaling by using RRC parameter(s) whether implicitly or explicitly. For example, an example RRC parameter Scheme can be used to select at least between sub-embodiment I.2 and sub-embodiment II.1. Optionally, two example RRC parameters MPE-CRI and MPE-ULTCI can be used to switch on/off sub-embodiment I.2 and sub-embodiment II.1, respectively. In one example, this configuration is subject to UE capability reported by the UE. For example, the UE reports one of or both of sub-embodiment I.2 and sub-embodiment II.1 in the UE's capability. Or, one of sub-embodiment I.2 and sub-embodiment II.1 is the default scheme (supported by all UEs), and whether the UE is capable to support another scheme is reported by the UE in the UE's capability signaling.

Optionally, if sub-embodiment I.2 and sub-embodiment II.1 are supported, the selected scheme can be determined by another system configuration, such as whether beam correspondence is to be utilized or not, or the level of beam correspondence supported by the UE. For example, if beam correspondence is to be utilized and/or the UE supports the highest level of beam correspondence, sub-embodiment I.2 is configured. Else, if beam correspondence is not to be utilized and/or the UE supports the lowest level of beam correspondence, sub-embodiment II.1 is configured. Such implicit configuration can also be coupled with whether MPE mitigation scheme is to be used or not. That is, these two options are relevant when an RRC parameter that regulates the use of MPE mitigation scheme is switched on.

Any of the above variation embodiments can be utilized independently or in combination with at least one other variation embodiment.

Figure 10:
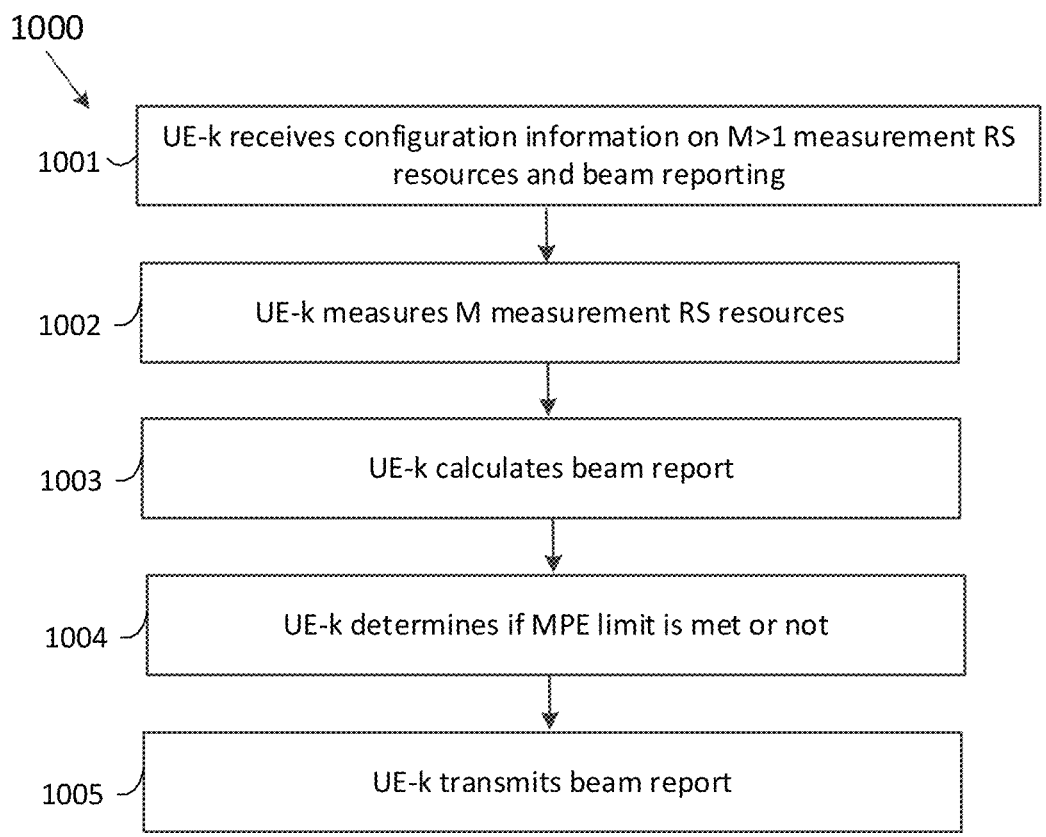
FIG. 10 illustrates a flowchart for an example method wherein a UE receives configuration information on a plurality of measurement RS resources and beam reporting according to one or more embodiments of the present disclosure.

FIG. 10 illustrates a flowchart for an example method 1000 wherein a UE receives configuration information on a plurality of measurement RS resources and beam reporting according to an embodiment of the present disclosure. For example, the method 1000 can be performed by the UE 116. The embodiment of the method 1000 shown in FIG. 10 is for illustration only.

The method 1000 begins with the UE (termed UE-k) receiving, from a base station, configuration information on a plurality of (M>1) measurement reference signal (RS) resources, and configuration information on a beam reporting (step 1001). The UE measures the M measurement RS resources (step 1002) and calculates, based on such measurement, the beam reporting (step 1003). For the measurement RS resources, at least one of the measurement RS resources is either synchronization signal block (SSB) or channel state information RS (CSI-RS). The beam reporting can include at least one resource indicator and the resource indicator's associated layer-1 RS received power (L1-RSRP). For SSB, the resource indicator would be the SSB-RI whereas for CSI-RS, the resource indicator would be CRI. Optionally, the beam reporting includes at least one resource indicator and the resource indicator's associated layer-1 signal-to-interference-and-noise ratio (L1-SINR). Optionally, the beam reporting includes at least one resource indicator and the resource indicator's associated uplink transmit configuration indication (UL TCI).

The UE (whether before, after, or in parallel with the calculation of the beam reporting) determines whether maximum permissible exposure (MPE) limit is met (step 1004). In addition to the aforementioned resource indicator and the resource indicator's associated beam metric (such as L1-RSRP or L1-SINR), the beam reporting can include an indicator which takes a first value when the MPE limit is met and a second value when the MPE limit is not met. This indicator can be a one-bit flag taking one or zero as a value. In turn, the UE transmits the beam reporting (step 1005) wherein a content of the beam reporting depends on whether the MPE limit is met or not. For instance, if L1-SINR is used as the beam metric, the beam reporting can include at least one resource indicator and the resource indicator's associated L1-RSRP such that the MPE limit is met.

Figure 11:
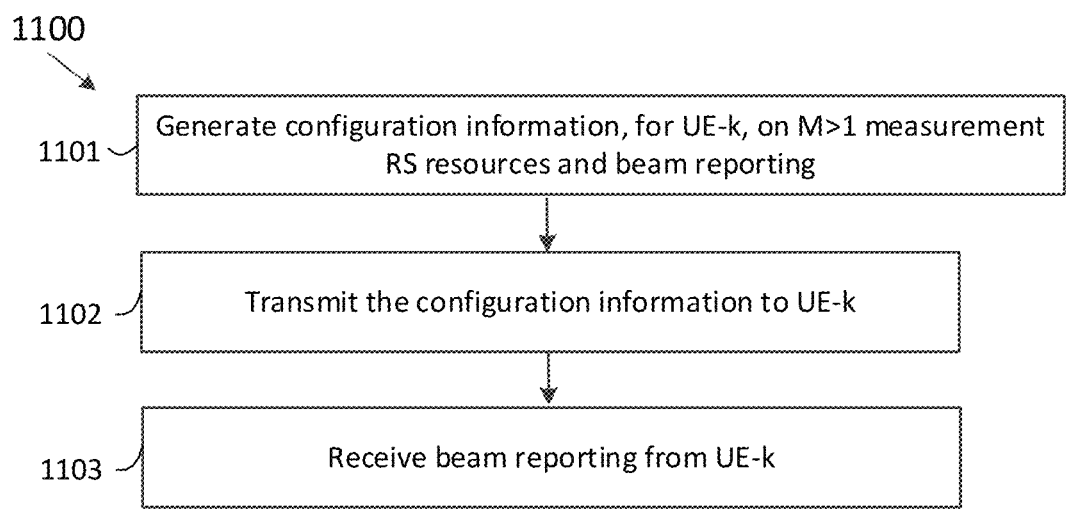
FIG. 11 illustrates a flowchart for an example method wherein a BS generates a configuration information on a plurality of measurement RS resources and beam reporting according to one or more embodiments of the present disclosure.

FIG. 11 illustrates a flowchart for an example method 1100 wherein a BS generates configuration information on a plurality of measurement RS resources and beam reporting, to a UE (labeled as UE-k) according to an embodiment of the present disclosure. For example, the method 1100 can be performed by the BS 102. The embodiment of the method 1100 shown in FIG. 11 is for illustration only.

The method 1100 begins with the BS generating, to UE-k, configuration information on a plurality of measurement RS resources and beam reporting (step 1101). The BS transmits the configuration information to UE-k (step 1102). The BS also receives beam reporting from UE-k which includes interference measurement based on the two CSI-IM resources (step 903).

For the measurement RS resources, at least one of the measurement RS resources is either synchronization signal block (SSB) or channel state information RS (CSI-RS). The beam reporting can include at least one resource indicator and the resource indicator's associated layer-1 RS received power (L1-RSRP). For SSB, the resource indicator would be the SSB-RI whereas for CSI-RS, the resource indicator would be CRI. Optionally, the beam reporting includes at least one resource indicator and the resource indicator's associated layer-1 signal-to-interference-and-noise ratio (L1-SINR). Optionally, the beam reporting includes at least one resource indicator and the resource indicator's associated uplink transmit configuration indication (UL TCI).

Furthermore, the content of the beam reporting depends on whether a maximum permissible exposure (MPE) limit is met or not. For instance, if L1-SINR is used as the beam metric, the beam reporting can include at least one resource indicator and the resource indicator's associated L1-RSRP such that the MPE limit is met. In addition to the aforementioned resource indicator and the resource indicator's associated beam metric (such as L1-RSRP or L1-SINR), the beam reporting can include an indicator which takes a first value when the MPE limit is met and a second value when the MPE limit is not met. This indicator can be a one-bit flag taking one or zero as a value.

Although FIGS. 10 and 11 illustrate examples of methods for receiving configuration information and configuring a UE, respectively, various changes can be made to FIGS. 10 and 11. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed:

1. A user equipment (UE) comprising:
a transceiver configured to receive configuration information including information on measurement reference signal (RS) resources and information on a beam reporting; and
a processor operably connected to the transceiver, the processor configured to:
measure the measurement RS resources,
calculate, based on the measurement, the beam reporting, and
determine whether a maximum permissible exposure (MPE) limit is met;
wherein the transceiver is further configured to, in response to a determination that the MPE limit is not met, transmit the beam reporting, wherein the beam reporting includes information indicating how far the MPE limit was from being met, and
wherein the processor is further configured to, in response to a determination that the MPE limit is met, determine not to instruct the transceiver to transmit the beam reporting.

2. The UE of claim 1, wherein at least one of the measurement RS resources is a synchronization signal block (SSB) or a channel state information RS (CSI-RS).

3. The UE of claim 1, wherein the beam reporting includes at least one resource indicator and a layer-1 RS received power (L1-RSRP) associated with the at least one resource indicator.

4. The UE of claim 1, wherein the information in the beam reporting further indicates, based on the measurement, how far a reception associated with a beam reported on in the beam reporting was from meeting the MPE limit.

5. The UE of claim 1, wherein the beam reporting includes at least one resource indicator and a layer-1 RS received power (L1-RSRP) associated with the at least one resource indicator.

6. The UE of claim 1, wherein the beam reporting includes at least one resource indicator and a layer-1 signal-to-interference-and-noise ratio (L1-SINR) associated with the at least one resource indicator.

7. The UE of claim 1, wherein the beam reporting includes at least one resource indicator and an uplink transmit configuration indication (UL TCI) associated with the at least one resource indicator.

8. A base station (BS) comprising:
a processor configured to generate configuration information including information on a plurality of measurement reference signal (RS) resources and information on a beam reporting; and
a transceiver operably connected to the processor, the transceiver configured to:
transmit the configuration information, and
determine whether a maximum permissible exposure (MPE) limit is met based on whether the beam reporting is received, wherein the beam reporting is received when the MPE limit is not met and not received when the MPE limit is met, and wherein, when received, the beam reporting includes information indicating how far the MPE limit was from being met.

9. The BS of claim 8, wherein at least one of the measurement RS resources is a synchronization signal block (SSB) or a channel state information RS (CSI-RS).

10. The BS of claim 8, wherein the beam reporting includes at least one resource indicator and a layer-1 RS received power (L1-RSRP) associated with the at least one resource indicator.

11. The BS of claim 8, wherein the information in the beam reporting further indicates how far a transmission associated with a beam reported on in the beam reporting was from meeting the MPE limit.

12. The BS of claim 8, wherein the beam reporting includes at least one resource indicator and a layer-1 RS received power (L1-RSRP) associated with the at least one resource indicator.

13. The BS of claim 8, wherein the beam reporting includes at least one resource indicator and a layer-1 signal-to-interference-and-noise ratio (L1-SINR) associated with the at least one resource indicator.

14. A method for operating a user equipment (UE), the method comprising:
   receiving configuration information including information on a plurality of measurement reference signal (RS) resources and information on a beam reporting;
   measuring the measurement RS resources;
   calculating, based on the measurement, the beam reporting;
   determining whether a maximum permissible exposure (MPE) limit is met;
   determining whether to transmit the beam reporting based on whether the MPE limit is met;
   in response to a determination that the MPE limit is not met, transmitting the beam reporting, wherein the beam reporting includes information indicating how far the MPE limit was from being met; and
   in response to a determination that the MPE limit is met, determining to not transmit the beam reporting.

15. The method of claim 14, wherein at least one of the measurement RS resources is a synchronization signal block (SSB) or a channel state information RS (CSI-RS).

16. The method of claim 14, wherein the beam reporting includes at least one resource indicator and a layer-1 RS received power (L1-RSRP) associated with the at least one resource indicator.

17. The method of claim 14, wherein the information in the beam reporting further indicates, based on the measurement, how far a reception associated with a beam reported on in the beam reporting was from meeting the MPE limit.

18. The method of claim 14, wherein the beam reporting includes at least one resource indicator and a layer-1 RS received power (L1-RSRP) associated with the at least one resource indicator.

19. The method of claim 14, wherein the beam reporting includes at least one resource indicator and a layer-1 signal-to-interference-and-noise ratio (L1-SINR) associated with the at least one resource indicator.

20. The method of claim 14, wherein the beam reporting includes at least one resource indicator and an uplink transmit configuration indication (UL TCI) associated with the at least one resource indicator.

* * * * *